United States Patent [19]
Dokuzoguz et al.

[11] 3,860,412
[45] Jan. 14, 1975

[54] PROCESS FOR UPGRADING OF TITANIFEROUS MATERIALS

[76] Inventors: Halit Zafer Dokuzoguz, 27 Alzenauer Str., Rodenbach I, Germany; George Leathwhite Roberts, Jr., 117 Wyngate Rd., Savannah, Ga. 46904

[22] Filed: July 16, 1973

[21] Appl. No.: 379,505

[52] U.S. Cl............................ 75/1, 75/115, 423/82, 423/86
[51] Int. Cl........................ C01g 23/02, C01g 23/08
[58] Field of Search ............... 75/1, 115; 423/71, 86

[56] References Cited
UNITED STATES PATENTS

| | | | |
|---|---|---|---|
| 2,290,111 | 7/1942 | Merriam et al. | 75/115 X |
| 2,751,307 | 6/1956 | Armant et al. | 75/1 |
| 3,416,885 | 12/1968 | Honchar | 75/1 X |
| 3,480,386 | 11/1969 | McMahon | 75/115 X |

FOREIGN PATENTS OR APPLICATIONS

| | | | |
|---|---|---|---|
| 213,860 | 3/1958 | Australia | 75/115 |
| 571,730 | 3/1959 | Canada | 75/115 |

*Primary Examiner*—Allen B. Curtis
*Attorney, Agent, or Firm*—Philip Mintz; Roland A. Dexter

[57] ABSTRACT

Beneficiation of titaniferous materials containing at least 40 percent titania is achieved by partial dissolution of the ore with sulfuric acid and subsequent recovery of the precipitated particulate matter in the slurry resulting from said dissolution. The recovered particulate solids contain at least about 90 percent titania in a form suitable as feedstock for its direct chlorination.

5 Claims, No Drawings

PROCESS FOR UPGRADING OF TITANIFEROUS MATERIALS

This invention relates to a process of beneficiation of titaniferous materials. The materials of which the process is applicable include most mineralogical varieties of titaniferous iron oxide compounds containing at least 40 percent by weight of titania and up to 60 percent by weight of iron (calculated as ferric oxide). In particular, the invention relates to a beneficiation process wherein said materials are digested with sulfuric acid to provide feedstock for the production of titanium tetrachloride which is subsequently oxidized in the vapor phase to pigmentary titanium dioxide.

Titanium tetrachloride is produced by chlorination of a titanium-bearing material, usually mineral rutile which contains a high proportion, for example, at least 95 percent up to 98 percent by weight of titanium dioxide with a small amount of iron oxide and other impurities. Rutile is usually used as feed in the "chloride" process because of its high titanium dioxide content and low iron content.

Much of the world's resources of titaniferous materials are in forms which contain a substantial proportion of iron oxide and other impurities. For example, the titanium dioxide content of an ilmenite ore can be 40 percent by weight or lower and if such products are to be used for the production of titanium tetrachloride, it is necessary to increase the proportion of titanium dioxide content in the material by beneficiation. Another source containing titanium values is titanium bearing slag.

A full discussion of the multiplicity of approaches to increasing the titania content of titanium value materials through beneficiation of titanium containing minerals is set forth in a 1970 Bureau of Mines Information Circular No. 8450, entitled "A Review of Proposed Processes for Making Rutile Substitutes" by Henn and Barclay.

It would be advantageous if a process for beneficiation of a titaniferous material could be used which produces a feedstock at least equivalent to the existing mineral rutile in $TiO_2$ content which may be used directly in the chlorination stage for the production of titanium tetrachloride.

It is the object of this invention to provide a beneficiation process for titaniferous material which results in a titanium containing material suitable as a feed for the production of titanium tetrachloride.

In accordance with this invention, there is provided a method for the beneficiation of material containing titanium values comprising the steps of partially dissolving said material in particulate form with sulfuric acid, heating the resulting slurry to a boil and recovering the solid particles from said boiled slurry to provide a feedstock for the preparation of titanium tetrachloride by the direct chlorination of said particles.

In its preferred form this invention provides a feed containing at least 90 percent by weight of titania by a method for beneficiating titaniferous material containing at least 40 percent of titanium dioxide and up to 60 percent of iron oxide which comprises comminuting said material to a particle size of less than 75 microns in average diameter, mixing said comminuted material with sulfuric acid of 85 to 98 percent concentration in an amount and at a temperature sufficient to convert from about 25 to about 80 percent of the titanium values to water soluble sulfates, dissolving the resultant mixture in dilute sulfuric acid, boiling the resulting aqueous slurry for up to several hours in time, filtering said boiled slurry, washing the precipitate cake to remove the dissolved iron which is associated therewith and calcining said washed cake at a temperature of at least 650°C.

The invention arose from the discovery that boiling a slurry of partially digested titaniferous material provides precipitation so that about 100 percent of the titanium values ae recovered as filterable solids, while leaving the digested iron in solution. These recovered solids are of a size and purity useful for the chloride process.

This process although applicable to all commercial titania sources, is preferably used with titanium slag and ilmenites. Surprisingly, it can be used with those weathered ores wherein much of the iron content is fully oxidized, such as leucoxene and quilon. Titanium slags contain from about 65 to about 90 percent or more of titanium dioxide, from about 1 to about 16 percent of iron compounds, and from about 8 to about 20 percent of oxides of the basic fluxing agents employed in producing the titanium slags. These high titanium content slags are ordinarily produced by smelting titaniferous iron ores such as, for example, ilmenite under reducing conditions in the presence of basic fluxing agents whereby the major proportion of iron oxide contained in the ore is reduced to metallic iron and is separated in molten condition. The basic fluxing agents employed are ordinarily calcium oxide, magnesium oxide and aluminum oxide, and these fluxing agents are employed in quantities which produce fluid slags from which the molten iron may be removed by gravity separation. The slags obtained usually contain from about 65 to about 90 percent of more of $TiO_2$, 1–16 percent of iron expressed as FeO, 0.1–15 percent CaO, 1.0–7.3 percent MgO, 1.5–11 percent $Al_2O_3$ and 1.75–10.5 percent $SiO_2$. The slags ordinarily also contain small amounts, on the order of about 0.25–1.1 percent MnO, 0.04–0.2% $Cr_2O_3$, 0.2–0.6 percent of $V_2O_5$, and 0.1–0.1 percent of $P_2O_5$.

A process to provide feed for the chloride process in U.S. Pat. No. 2,770,529 uses a mixture of ilmenite, sulfuric acid, and coke. The ore is ground to minus 200 mesh and is mixed with minus 20-mesh coke, added in an amount equivalent to 20 to 35 percent of the weight of titanium dioxide. The concentration of sulfuric acid is 15 to 50 percent, and a sufficient quantity of the acid is used to provide from 25 to 100 percent excess over the amount needed to react with all the iron, calcium oxide, and magnesium oxide in the ore. After reaction at elevated pressures and subsequent filtration, the washed and dried residue contains from 50 to 70 percent $TiO_2$, 0.5 to 10 percent iron, 25 to 40 percent coke, and less than 2% total sulfates. The product is easily chlorinated to produce titanium tetrachloride, containing sufficient coke to obviate further addition as is required when chlorinating natural rutile.

Another process in Canadian Patent No. 582,549 uses sulfuric acid to upgrade titanium ores by selective removal of iron. In the process the oxidized ore and sulfuric acid of a concentration in the 7 to 25 percent range are added to an autoclave. The temperature of the autoclave is raised to 120° to 140°C. and maintained at that temperature for 2 to 3 hours. A reductant, used to reduce ferric iron to the ferrous state, is provided during the reaction by using a copper-lined autoclave cover or by adding hydrogen gas to the autoclave. The process is capable of removing up to 99 percent of the iron from the ore but suffers in utility as does 2,770,529 from the requirement of elevated pressures and specialized equipments for such an operation.

In British Pat. No. 1,243,798 the beneficiation of a titaniferous ore containing a substantial quantity of combined iron present as iron oxide comprises reducing the iron oxide of the ore to a reduced form capable of being removed by leaching, leaching the treated ore with sulfuric acid to remove reduced iron oxide, chlorinating the leached ore with chlorine gas in the presence of a reducing agent so that the remaining iron and other chlorinatable impurities are converted to volatile chlorides without any substantial chlorination or loss of titanium dioxide taking place and removing the volatile chlorides so produced from the treated ore.

The titaniferous material to be beneficiated according to this invention is preferably comminuted to a degree such that all of the particles will pass through a screen having 200 meshes per linear inch, i.e., the particles will have an average diameter of not more than 75 microns. The control of particle size facilitates the dissolution of the material containing titanium values. This beneficiation process involves the mixing of the particulate material with sulfuric acid having a concentration of from 85% to 98%. The digestion mixture is then heated, either directly or by the injection of steam or other heated gas to initiate reaction between the acid and the material resulting in a temperature rise to about 120°C. At this time water is added in an amount sufficient to provide a sulfuric acid concentration ranging from 83 to 93 percent. The heat of dilution drives the temperature to from 160°C. to 190°C resulting in a solid cake. The digestion cake is maintained at a temperature of 100°C. to 175°C. for from 3 to 6 hours.

This digestion and baking process of the invention converts about 25 to about 80 percent of the titanium values in the material to soluble titanium sulfates. This is achieved by control of the ratio of the ingredients in the digestion mixture to provide a sulfuric acid to titaniferous material weight ratio of 1:1 to 1.6:1.

After the digestion baking step is over, the cake is dissolved in water in a manner to provide from about 100 to 200 grams per liter of $TiO_2$. Initially water is added in an amount so that the resulting slurry has a concentration of 350 to 400 grams per liter of titanium dioxide. The slurry is further diluted with water to provide a $TiO_2$ concentration of 125 to 175 grams per liter. This diluted slurry is then boiled at 100°c. to 110°C. for an extended period of time; preferably, three to six hours. This boiling step precipitates substantially all of the dissolved titanium values as filterable solids and leaves the dissolved iron in solution.

The boiled slurry thus obtained is then processed by filtration and washing with water to remove substantially all of the iron. The resulting filter cake is then calcined in air at a temperature of from 700°C. to 1000°C. The resulting calcined cake will have from about 90 to 99 percent titania.

The process, according to the present invention produces a beneficiated ore containing a high proportion of titanium dioxide with a small amount of iron and other impurities which is eminently suitable for use in the production of titanium tetrachloride for use in the vapor phase oxidation process for the manufacture of pigmentary titanium dioxide, for example, by chlorination of the material in a fluidized bed in the presence of carbon. In many instances the product of the beneficiation process according to the invention is superior to naturally occurring mineral rutile which is conventionally used in the production of titanium tetrachloride and accordingly less complicated impurity separation apparatus and processes need be employed than would otherwise be necessary to eliminate impurities from titanium tetrachloride produced for use in the vapor phase oxidation process.

The invention is illustrated in the following:

EXAMPLES

In each instance the titaniferous material has been finely ground to less than 75 microns.

EXAMPLE 1

The ore sample of leucoxene had an analysis as follows:

| | |
|---|---|
| $TiO_2$ | 74.0% |
| $Fe_2O_3$ | 20.7% |
| Misc. Oxides | 2.3% |
| Volatiles | 2.4% |

1000 g. of ground ore were mixed with 1075 g. 93 percent $H_2SO_4$ at 45°C. to give an acid/ore ratio equal to 1.00 in an iron digestion pot on a hot plate. The mixture was stirred constantly. When the temperature of the mixture reached 120°C, 175 ml. of $H_2O$ were added to bring the acid strength to 86 percent. The temperature went up and the reaction became vigorous. The hot plate was turned off and the reaction subsided after 20 minutes. The resulting cake was baked at 170°C. for 3 hours. The cake was dissolved in 2 l. of water with stirring. The slurry thus obtained was divided into two equal portions; each portion was brought to 2500 ml. of volume and was processed by boiling for 5 hours with constant refluxing to yield $TiO_2 \cdot xH_2O \cdot ySO_3$.

The resulting coprecipitate slurry was flocculated with 100 ml. of glue solution (100 gram per liter) and filtered; the resulting cake was washed with 2 l. of warm water (50°–55°C.), and was calcined at 990°–1000°C. for 7 hours. The calcined solid had the following chemical composition:

| | | |
|---|---|---|
| $Fe_2O_3$ | = | 8.5% |
| $TiO_2$ | = | 89.2% | so that about 60 percent of the iron had been removed leaving the above feedstock highly useful for chlorination to provide titanium tetrachloride.

EXAMPLE 2

The procedural steps of Example 1 were followed with the same material, however, an acid/ore ratio of 1.4 was used (1000 g. of ore to 1505 g. of 93 percent $H_2SO_4$). During digestion, 125 ml. of $H_2O$ were added when the temperature reached 120°C. to yield 86 percent acid strength. The resulting calcined cake had the following composition:

| | | |
|---|---|---|
| $Fe_2O_3$ | = | 4.4% |
| $TiO_2$ | = | 94.2% | whereby about 80 percent of the iron was removed with no significant loss of titanium.

EXAMPLE 3

An ilmenite type ore of the following composition:

| | | |
|---|---|---|
| $TiO_2$ | = | 45.8% |
| FeO | = | 35.9% |
| $Fe_2O_3$ | = | 14.8% |
| Misc. Oxides (Total) | = | 3% | was beneficiated in this experiment. The acid/ore ratio was 1.375. The resultant slurry from the dissolution of the digestion cake had a specific gravity of 1,610. The sulfuric acid digestion step was carried out essentially as in the foregoing Examples, except that an addition of iron filings was made to the dissolved reaction mixture to reduce all of the Fe (III) to Fe (II). The hydrolysis reaction was carried out with a 2,540 ml. liquor sample by boiling at constant temperature (105°C.) and volume over a period of 5 hours. The hydrolysate was filtered, washed with 2 l. of warm water (50°–55°C.). and was calcined at 1000°C. for 7 hours. The calcined solid had the following composition:

| | | |
|---|---|---|
| $Fe_2O_3$ | = | 1% |
| $TiO_2$ | = | 99% | resulting in removal of over 98 percent of the iron with no significant loss of titanium.

Recovery of $H_2SO_4$ from the waste end liquor through recycling is a commercially available process which can be incorporated into the process of the invention to reduce the cost and to minimize the pollution. Another novel feature of this invention is that the separated iron can be oxidized and recovered from the waste end liquor as $Fe_2O_3$ by known techniques and the oxides of sulfur obtained as the by-product can by recycled to be used in making $H_2SO_4$. It was surprising that even though undissolved particles of ore are present in this beneficiation process of the invention, particularly in the hydrolysis step, virtually all of the titanium values are recovered at a usefully low iron content.

What is claimed:

1. a method for beneficiating titaniferous material containing at least 40 percent of titanium dioxide and up to 60 percent or iron (calculated as ferric oxide) which comprises comminuting said material to a particle size of less than 75 microns in average diameter, mixing said comminuted material with 85 to 98 percent sulfuric acid in an amount and at a temperature sufficient to convert from about 25 to about 80 percent of the titanium values to water soluble titanium sulfates, dissolving from 60 to about 90 percent of the iron of said material by the addition of dilute sulfuric acid, boiling the resulting aqueous slurry for up to several hours in time, filtering said boiled slurry, washing the precipitate cake to remove said dissolved iron and calcining said washed cake at a temperature of at least 650°C. whereby a feedstock suitable for the preparation of titanium tetrachloride by the direct chlorination is obtained.

2. The method of beneficiating titanium containing material comprising the steps of:
   a. digesting particles of said material with sulfuric acid at an elevated temperature;
   b. dissolving from about 60 to about 90 percent of the iron content of said material by the addition of water or dilute sulfuric acid by providing an acid to material ratio of 1:1 to 1.6:1;
   c. boiling said adjusted slurry at a temperature of from 100°C. to 110°C. for from 1 hour to 6 hours;
   d. filtering said boiled slurry, washing the resulting precipitate to remove substantially all of the dissolved iron; and,
   e. calcining the washed precipitate at a temperature of from 700°C. to 1000°C.

3. The method of claim 2 characterized in that said material is weathered such as leucoxene and quilon.

4. The method of claim 2 wherein there is added to said slurry a reducing agent such as iron filings in an amount sufficient to reduce substantially all of the ferric iron content of said material to ferrous iron whereby the iron content of said washed precipitate is further decreased.

5. A process for beneficiating titaniferous material comprising the steps of:
   a. digesting particles of said material with 1 to 1.6 parts of concentrated sulfuric acid per part of said material at elevated temperature to produce a digestion cake;
   b. baking said digestion cake to convert about 25 to about 80 percent of the titanium values in the material to soluble titanium sulfates;
   c. dissolving the baked digestion cake in water or dilute sulfuric acid to provide an aqueous slurry containing about 100 to 200 grams of titanium values (expressed as $TiO_2$) per liter;
   d. boiling said slurry to precipitate substantially all the titanium values as filterable solids while leaving the dissolved iron in solution;
   e. filtering the boiled slurry and washing the resulting precipitate substantially free of dissolved iron; and
   f. calcining the washed precipitate at 700°C. to 1000°C. to produce calcined cake suitable for direct chlorination to produce titanium tetrachloride.

* * * * *

UNITED STATES PATENT OFFICE
CERTIFICATE OF CORRECTION

Patent No. 3,860,412           Dated January 14, 1975

Inventor(s) Halit Zafer Dokuzoguz & George Leathwhite Roberts, Jr.

It is certified that error appears in the above-identified patent and that said Letters Patent are hereby corrected as shown below:

Title page, Section 76 (Inventors): after ZIP Code "46904" please insert -- , assignors to American Cyanamid Company, Stamford, Conn. --

Column 2, line 11: "ae" should read -- are --.

Column 2, line 36: "90 percent of" should read -- 90 percent or --.

Column 2, line 41: "0.1-0.1" should read -- 0.0-0.1 --.

Column 5, line 48: "or" should read -- of --.

Signed and sealed this 6th day of May 1975.

(SEAL)
Attest:

RUTH C. MASON
Attesting Officer

C. MARSHALL DANN
Commissioner of Patents
and Trademarks